United States Patent [19]

O'Brien et al.

[11] 3,757,569
[45] Sept. 11, 1973

[54] FLAW OR CHIP DETECTOR

[75] Inventors: James E. O'Brien, Kettering; Emerson E. Schmidt, Dayton, both of Ohio

[73] Assignee: The Bendix Corporation, Southfield, Mich.

[22] Filed: Jan. 24, 1972

[21] Appl. No.: 220,023

[52] U.S. Cl. .................................. 73/104, 33/174 L
[51] Int. Cl. .............................................. G01b 5/28
[58] Field of Search ....................... 73/104; 33/179.5, 33/174 L, 178 F

[56] References Cited
UNITED STATES PATENTS

| | | | |
|---|---|---|---|
| 2,965,971 | 12/1960 | Pomernacki | 33/179.5 R |
| 3,216,122 | 11/1965 | Vincent et al. | 33/178 F |
| 3,194,061 | 7/1965 | Sorenson et al. | 73/104 |
| 3,259,990 | 7/1966 | Key, Jr. | 33/178 F |

Primary Examiner—Richard C. Queisser
Assistant Examiner—Arthur E. Korkosz
Attorney—William S. Thompson and John R. Benefiel

[57] ABSTRACT

An arrangement is disclosed which detects flaws such as burrs, nicks, and/or chips by measuring the extent of deviations of the surface inspected by means of a displaceable gaging head traversed over the surface and an arrangement for generating signals corresponding to the displacement of the gaging head, with means to distinguish dimensional variations from flaws or chips by eliminating signals corresponding to displacements occurring at a low rate of change per unit length of the surface and detecting signals corresponding to displacements occurring at a high rate of change indicating the presence of a flow or chip. In the preferred embodiment, the gaging head includes a roller element adapted to be moved over an internal surface of a bore by a rotatable carrier assembly, with the angular displacements of a gaging head support member pivotally carried by the carrier assembly measured by an electronic transducer to provide the displacement signal, which is amplified and fed to an electronic filter circuit used to eliminate displacement signals corresponding to a low rate of change thereof.

5 Claims, 6 Drawing Figures

United States Patent
O'Brien et al.
[11] 3,757,569
[45] Sept. 11, 1973
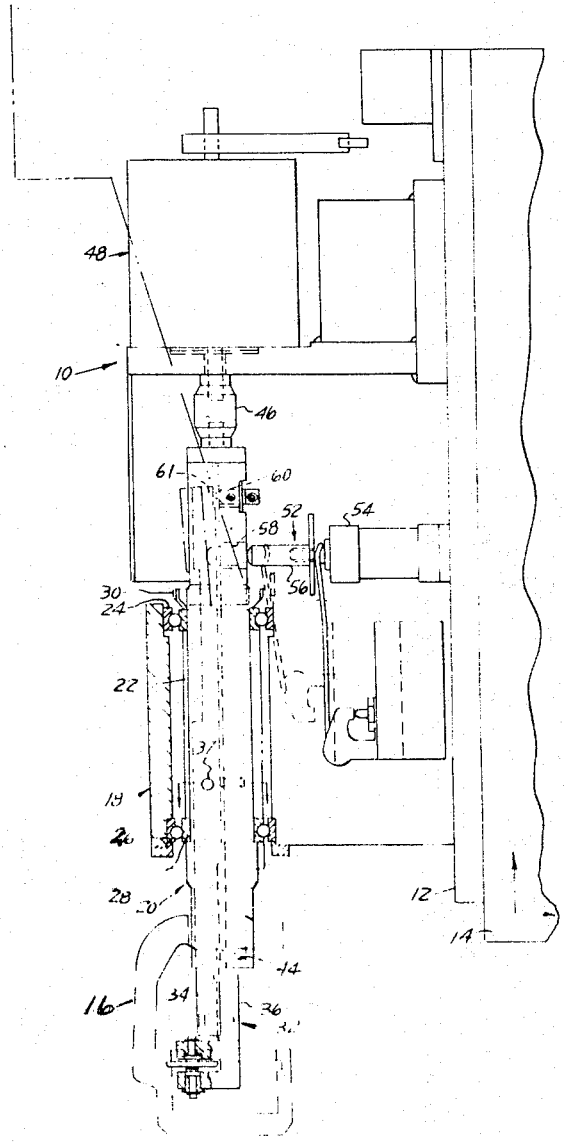

Patented Sept. 11, 1973

Patented Sept. 11, 1973

FLAW OR CHIP DETECTOR

BACKGROUND OF THE INVENTION

1. Field of the Invention

This invention concerns flaw detectors and more particularly flaw detectors suited to detecting burrs or chips on machined metal surfaces.

2. Description of the Prior Art

Modern automatic assembly of components such as disc brake actuators has brought with it the need for automatic inspection of individual parts, such as the caliper housing containing grooves for O-ring seals. In such cases it has been found that slight nicks, burrs, or chips therein from machining these grooves will cause unacceptable leakage. These flaws may sometimes be of such a size that they are on the same order as the acceptable dimensional variations of the part such as basic size, out-of-round, etc., and thus conventional automatic gaging of the parcwill not detect the flaw.

In addition, gaging systems which utilize conventional probes such as air jet nozzles or "finger" probes will often miss loose chips as the probe tends to displace the chips ahead of it as the probe is traversed over the surface.

The basic arrangement of the system also should be such that it is capable of operating automatically by means of motors, cylinders, limit switches, etc., so as to be capable of being integrated into an automatic assembly machine.

Therefore, it is an object of the present invention to provide a flaw or chip detection system which will detect flaws or chips of a size on the order of or less than the size of normal or acceptable dimensional variations in the part inspected.

Another object is to provide a gaging head which will reduce the incidence of undetected chips on the surface inspected as a result of displacement thereof.

A further object is to provide such an arrangement which is capable of being readily incorporated into an automatic assembly machine.

SUMMARY OF THE INVENTION

These and other objects, which will become apparent upon a reading of the following specification and claims, are accomplished by measuring the extent of deviations of the surface inspected by means of a displaceable gaging head traversed over the surface and an arrangement for generating signals corresponding to the displacement of the gaging head, with means to distinguish dimensional variations from flaws or chips by eliminating signals corresponding to displacements occurring at a low rate of change per unit length of the surface and detecting signals corresponding to displacement occurring at a high rate of change indicating the presence of a flaw or chip. In the preferred embodiment, the gaging head includes a roller adapted to be moved over an internal surface of a bore by a rotatable carrier assembly, with the angular displacements of a gaging head support member pivotally carried by the carrier assembly measured by an electronic transducer to provide the displacement signal and an electronic filter circuit used to eliminate displacement signals corresponding to a low rate of change thereof.

DETAILED DESCRIPTION

In the following detailed description certain specific terminology will be utilized for the sake of clarity and a specific embodiment will be described in order to provide a complete understanding of the invention, but it is to be understood that the invention is not so limited and may be practiced in a variety of forms and embodiments.

Figure 1:
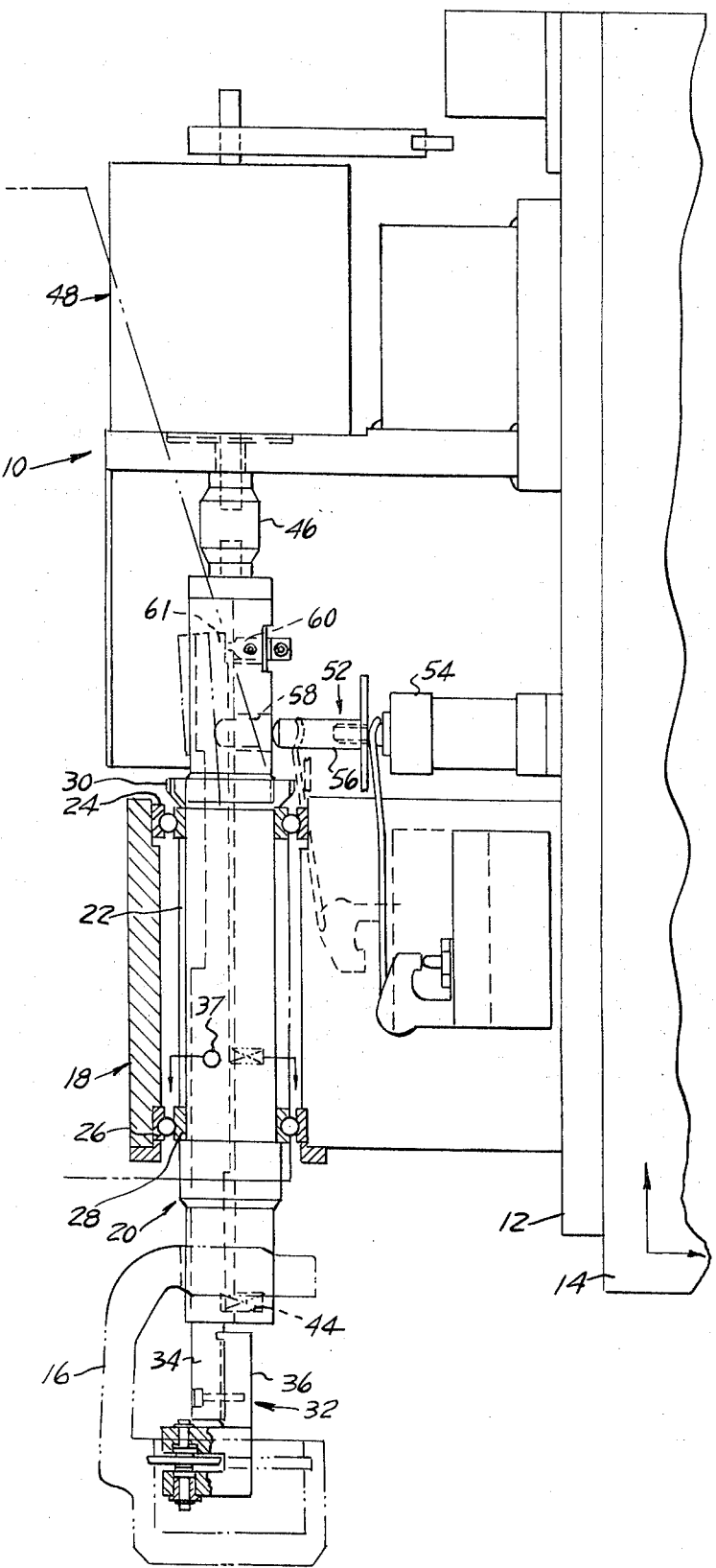
FIG. 1 is a front elevational view in partial section of a detector assembly according to the present invention.
Figure 3:
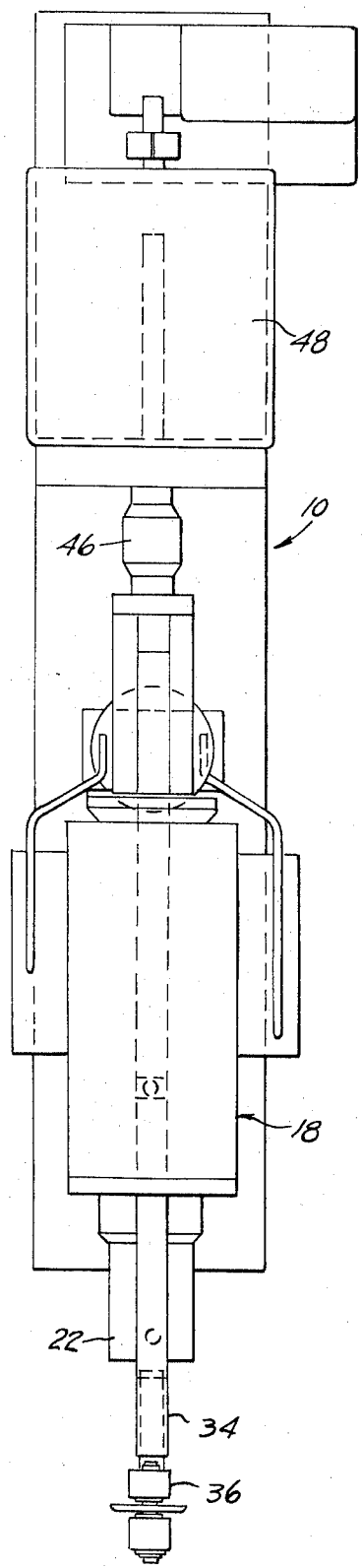
FIG. 3 is a side elevational view of a detector assembly according to the present invention.
Figure 6:
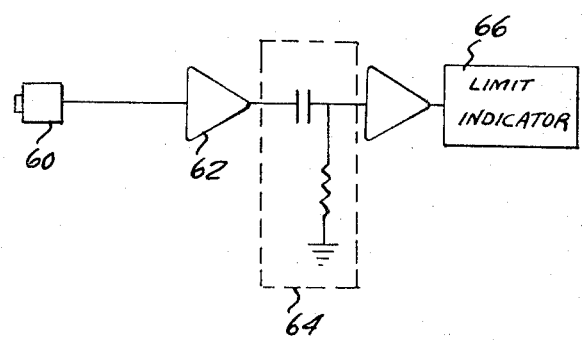
FIG. 6 is a diagrammatic view of the sensing and processing arrangement according to the present invention.
Figure 2:
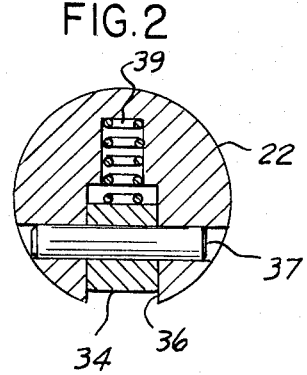
FIG. 2 is a view of the section taken along the lines 2—2 in FIG. 1.
Figure 4:
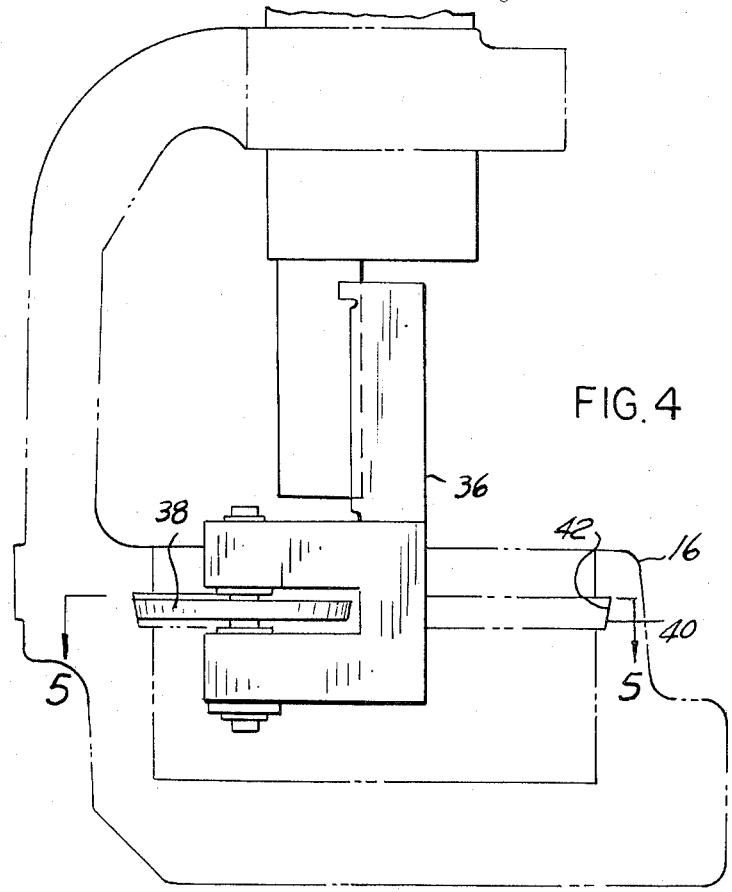
FIG. 4 is an enlarged view of the workpiece and reading head shown in FIG. 1.

Referring to the Drawings, and particularly FIGS. 1—3, a detector assembly 10 is depicted, without however showing the hardware comprising the fluid, electrical, or indicating circuitry depicted diagrammatically in FIG. 6.

The detector assembly 10 includes a mounting plate 12 secured to a slide member 14 capable of limited linear motion in either direction as shown by the arrows in order to move the detector assembly 10 as a whole into and out of position with respect to a workpiece 16 in the manner well-known in regard to automatic assembly and inspection equipment.

Fixed to the mounting plate 12 is a bearing assembly 18 which rotatably supports a carrier assembly 20, which includes a carrier shaft 22 disposed within rotary bearings 24 and 26 and which is axially located by means of shoulder 28 and the adjustable thrust ring 30 which is threaded on the O.D. of carrier shaft 22. This allows for adjustment of the axial position gaging head assembly 32 carried by the carrier shaft to provide precise location with respect to the workpiece 16.

The gaging head assembly 32 is carried by the main carrier shaft 22 by means of a support rod 34 disposed in a longitudinal slot 36 (best seen in FIG. 2) and pinned thereto at 37 so as to be capable of limited rotation thereabout on an axis transverse to the axis of rotation of the carrier assembly 18. A bias spring 39 may be included to reduce any looseness at this pivotal connection.

Fastened to the support rod 34 is a fork member 36 which rotatably supports a roller element 38 having an edge contour 40 such as to run with its periphery engaged in the outer wall 42 of the groove to be inspected in the workpiece 16.

The axis of rotation of carrier shaft 22 is offset from that of the roller 38 and coincides with that of the groove wall 42 so that upon rotation thereof the roller rolls about the interior of the workpiece in contact with the groove wall 42. To insure this contact is maintained, a bias spring 44 is provided which urges the support rod out to the left as viewed in FIG. 1 so as to urge the roller 38 into contact with the groove wall 42.

In order to provide such rotation, carrier shaft 22 is connected by means of coupling 46 to a slow speed (72 rpm) synchronous motor 48 which when activated will provide a carefully controlled angular velocity, which is important in processing the displacement signals obtained from the device.

Figure 5:
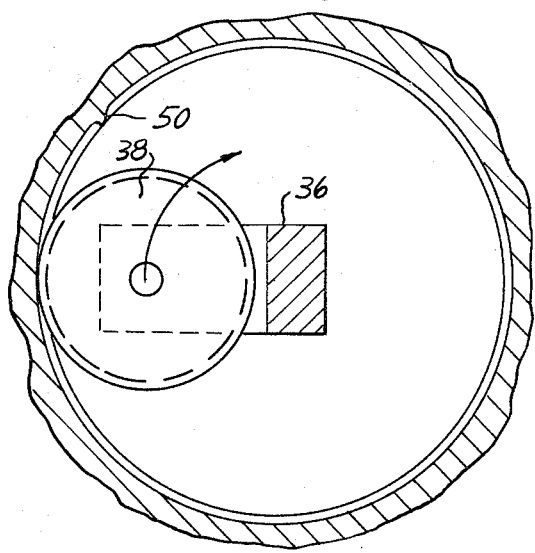
FIG. 5 is a view of the section taken along the line 5—5 in FIG. 4.

As the roller 38 is rotated at the predetermined constant speed about the groove wall 42, variations in the distance from the wall 42 and the axis of rotation caused by groove out-of-round, slight mispositioning of the workpiece 16, or flaws or chips as depicted in exaggerated form at 50 in FIG. 5, the support rod 34 is caused to pivot about its pivot point 37.

In order to provide for placement of the gaging head assembly with the roller 38 inside the workpiece 16, a retraction mechanism 52 is provided which includes a power cylinder 54 having an actuation pin 56 affixed to the output thereof. A clearance hole 58 is provided in the carrier shaft 52 which aligns with the actuation pin 56 in the "zero" position to allow the actuation pin 56 to move therethrough and engage the support member 34 and move it to the position shown in phantom lines which allows the gaging head assembly 32 to clear the workpiece and to be retracted upon actuation of the slide 12.

For simplicity sake, the various limit switches, relays, etc., to provide sequencing of the inspection cycle have not been described as such arrangements are well-known in this field and many conventional arrangements are available for accomplishing this end.

A signal corresponding to the extent of the sensing pivotal movement is created by means of a sensing head carried by the carrier shaft 52 taking the form of a gaging electronic transducer 60 of any suitable type located juxtaposed to the upper end 61 of the support rod 34. The relative lenghts of the upper and lower portions of the support rod 34 can be selected to provide equal displacement at the roller 38 and electronic transducer.

As seen in FIG. 6, the electronic transducer 60 operates in the manner well-known in the art to produce an electrical signal which varies with the proximity of the upper end 61 thereto. Thus, this overall arrangement constitutes sensing means for generating signals corresponding to dimensional variations in the groove surface 42.

These signals are then amplified by amplifier 62 before being fed to a filtering circuit 64. This circuit is an RC circuit such that electrical signals below a predetermined frequency are not passed by proper selection of the capacitance and resistance therein.

This frequency is selected to be that corresponding to rates of radial displacement that occur at the rotational velocity of the carrier assembly 18 in response to flaws such as burrs, nicks, and/or chips, etc. Since these occur at a much faster rate, that is, over a much narrower angular space than radial displacements due to variations of diameter such as out-of-round, eccentric location of the workpiece, etc., it can be seen that this circuit can prevent one signal from being passed therethrough which is greater than another signal which develops at this much faster rate.

From this it can be understood that the controlled velocity movement of the roller 38 constitutes a means for detecting the slope of the dimensional variation or its rate of change over a unit distance of the surface inspected and that together with the filtering circuit 64 this arrangement comprises a varying means varying the effect signals generated by the sensing means has on the output means 66, which effect is relied on to distinguish the flaws, etc., from simple dimensional variations.

Thus, for example, this arrangement can effectively distinguish between flaws of 0.002 inches height if these height variations occur over a short distance on the order of ⅛ inch or so and dimensional variations of 0.003 inches which occur over a longer distance on the order of 2 or 3 inches.

This arrangement also allows for dimensional variations between successive workpieces without transmitting a signal indicating a flaw or chip.

The signal thus allowed to pass is then fed to an output means 66, such as a suitable indicating alarm, or shutdown circuitry of any suitable design, which provides an output result in response to generation of a signal of a predetermined magnitude if it is of the frequency allowed to be passed by filtering circuit 64. This particular predetermined magnitude is selected to correspond to a dimensional variation which indicates a flaw or chip, which would be of a size unacceptable for the requirements of the particular workpiece 16.

From the above description, it can be appreciated that the objects of the present invention as provided by this arrangement inasmuch as flaws or chips are detected, which may be of lesser size than acceptable dimensional variations of the workpiece, the arrangement with the rotating carrier assembly and pivoted support member carried thereby provides an arrangement readily adapted to automatic operation, and the roller type gaging head contact reduces the incidence of the gaging head pushing chips ahead of it, as it will tend to ride up over loose chips.

In connection with this latter feature, it should be observed that chips above a certain size will still have a tendency to be pushed ahead of it, depending on the diameter of the roller, and hence it is advantageous to maximize its diameter. The forked design of fork member 36 allows for a relatively large roller diameter on the order of 1 ¼ inches for a groove diameter on the order of 3 inches.

Many variations are, of course, possible with the scope of the present invention as, for example, a different sensing arrangement than the electronic transducer such as fluid pressure signal generator means or alternative means for providing the filtering function of the signal frequency.

What is claimed is:

1. A detector assembly for sensing variations of the surface of an internal bore comprising:
   a carrier assembly;
   means rotatably supporting said carrier assembly;
   means for rotating said carrier assembly;
   gaging head means;
   means pivotally supporting said gaging head means on said carrier assembly on an axis transverse to the axis of rotation thereof including a support member connected to said gaging head means and pivotally supported on said carrier assembly on an axis transverse to said axis of rotation;
   means causing rotations of said gaging head means about said pivotal support as said carrier assembly is rotated in response to variations in the distance of said bore surface to said axis of rotation; and
   means for sensing the extent of movement of said gaging head means about said pivotal support including means generating a signal corresponding to the angular position of said support member about said pivotal connection;

output means providing an output result in response to signals generated by said sensing means corresponding to dimensional variations of a predetermined magnitude; and varying means varying the response of said output means to signals generated corresponding to dimensional variations of said predetermined magnitude occurring at a rate per unit length of said surface indicating the presence of a flaw or chip from the response to signals generated corresponding to dimensional variations of said predetermined magnitude occurring at a rate indicating surface variations other than flaws or chips, whereby these variations may be distinguished from dimensional variations corresponding to flaws or chips.

2. The assembly of claim 1 wherein said means causing rotation of said gaging head means includes a roller element rotatably supported by said gaging head means on an axis parallel to said axis of rotation and offset to engage said bore surface with the periphery thereof.

3. The arrangement of claim 1 wherein said carrier assembly includes a carrier shaft and wherein said support member is disposed in a slot formed in said carrier shaft.

4. The arrangement of claim 1 further including retraction means providing for selectively rotating said support member about said pivotal connection.

5. The arrangement of claim 4 wherein said retraction means includes a retraction element and also includes means causing said retraction element to engage said support member by moving through an opening in said carrier assembly.

* * * * *